(12) United States Patent
Moridaira et al.

(10) Patent No.: US 8,020,411 B2
(45) Date of Patent: Sep. 20, 2011

(54) METHOD OF MANUFACTURING SINGLE MODE OPTICAL FIBER

(75) Inventors: Hideya Moridaira, Tokyo (JP); Kazuhiko Kurusu, Tokyo (JP); Yoshihiro Inoue, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 1249 days.

(21) Appl. No.: 11/198,280

(22) Filed: Aug. 8, 2005

(65) Prior Publication Data

US 2005/0274151 A1    Dec. 15, 2005

Related U.S. Application Data

(62) Division of application No. 10/154,968, filed on May 28, 2002, now Pat. No. 6,954,572.

(30) Foreign Application Priority Data

Jul. 30, 2001 (JP) ................................ 2001-229238
Mar. 25, 2002 (JP) ................................ 2002-083548

(51) Int. Cl.
   *C03B 37/02*     (2006.01)
(52) U.S. Cl. .......................................... 65/435; 65/510
(58) Field of Classification Search ............... 65/435, 65/510

See application file for complete search history.

(56) References Cited

U.S. PATENT DOCUMENTS

| | | | |
|---|---|---|---|
| 3,652,248 A * | 3/1972 | Loxley et al. .................... 65/108 |
| 4,203,744 A * | 5/1980 | Schultz et al. ................... 65/399 |
| 4,515,612 A | 5/1985 | Burrus, Jr. et al. |
| 4,583,997 A | 4/1986 | Staudigl |
| 4,682,850 A | 7/1987 | White et al. |
| 4,702,759 A * | 10/1987 | Roba ............................... 65/510 |
| 5,713,979 A | 2/1998 | Nicholson et al. |
| 5,763,081 A | 6/1998 | Ohga et al. |
| 5,838,866 A | 11/1998 | Antos et al. |
| 5,928,574 A * | 7/1999 | DiMarcello et al. ......... 264/1.24 |
| 6,128,928 A | 10/2000 | Antos et al. |
| 6,131,415 A | 10/2000 | Chang et al. |
| 6,499,318 B1 | 12/2002 | Lemaire et al. |

(Continued)

FOREIGN PATENT DOCUMENTS

CN     1154345 A     7/1997

(Continued)

OTHER PUBLICATIONS

Patent Abstracts of Japan, JP 07-244002, Sep. 19, 1995.

*Primary Examiner* — Queenie Dehghan
(74) *Attorney, Agent, or Firm* — Oblon, Spivak, McClelland, Maier & Neustadt, L.L.P.

(57) ABSTRACT

A method of manufacturing a single mode optical fiber formed of a silica-based glass and including a glass part having a central core and a cladding region. The method including heating an optical fiber preform in a heating furnace including a first heater to melt the optical fiber preform, and fiber drawing an optical fiber from the molten optical fiber preform. The method further comprises continuously cooling the drawn optical fiber starting with a meniscus portion in which diameter is decreased from 90% of the preform diameter to 5% of the preform diameter to a portion where the drawn optical fiber has a temperature of 1,200° C. at a cooling rate of 1,000 to 3,000° C. /sec.

7 Claims, 5 Drawing Sheets

U.S. PATENT DOCUMENTS

| | | | |
|---|---|---|---|
| 6,576,164 B2 * | 6/2003 | Guenot et al. | 264/1.24 |
| 2002/0059816 A1 * | 5/2002 | Nagayama et al. | 65/435 |

FOREIGN PATENT DOCUMENTS

| | | |
|---|---|---|
| CN | 1186248 A | 7/1998 |
| EP | 0 673 895 | 9/1995 |
| EP | 0 762 159 | 3/1997 |
| EP | 1 104 891 | 6/2001 |
| JP | 62-241836 | 10/1987 |
| JP | 1-102507 | 4/1989 |
| JP | 1-103922 | 4/1989 |
| JP | 1-148722 | 6/1989 |
| JP | 1-164740 | 6/1989 |
| JP | 4-77327 | 3/1992 |
| JP | 7-244002 | 9/1995 |
| JP | 7-277770 | 10/1995 |
| JP | 10-25127 | 1/1998 |
| JP | 10-218635 | 8/1998 |
| JP | 2001-19464 | 1/2001 |
| JP | 2001-114526 | 4/2001 |
| JP | 2001-192228 | 7/2001 |

* cited by examiner

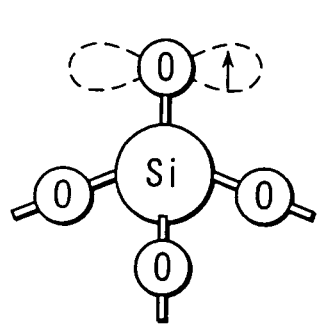 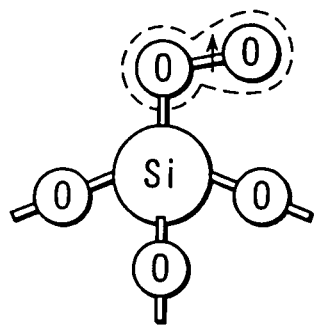 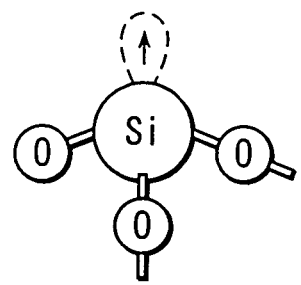
FIG. 1A     FIG. 1B     FIG. 1C
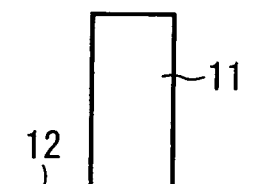 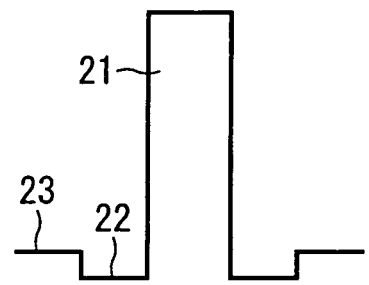
FIG. 2A     FIG. 2B
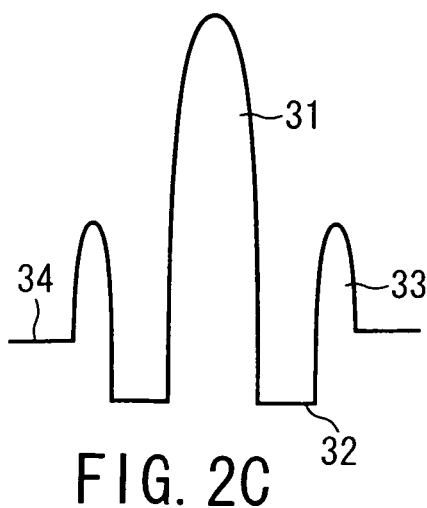 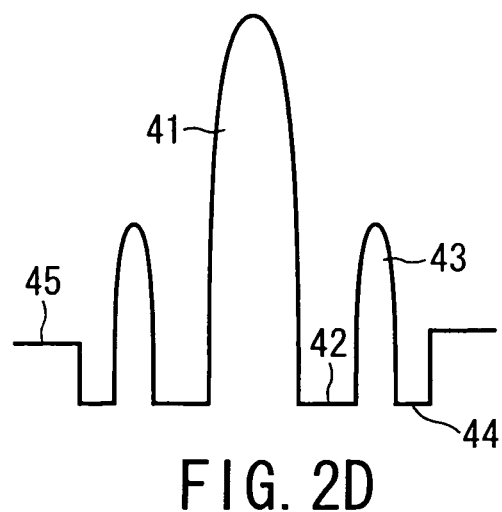
FIG. 2C     FIG. 2D

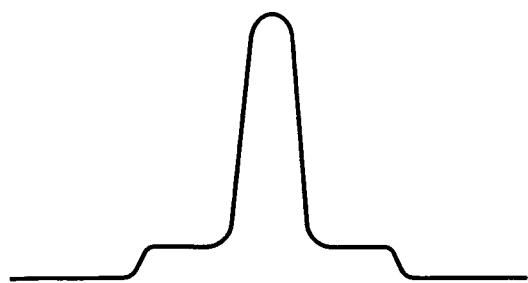
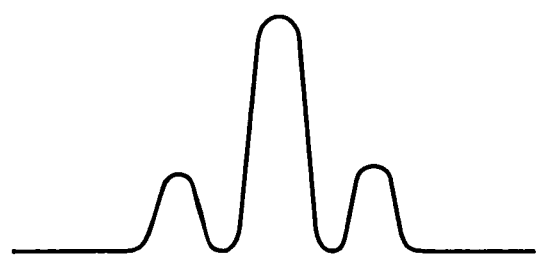
FIG. 3A         FIG. 3B
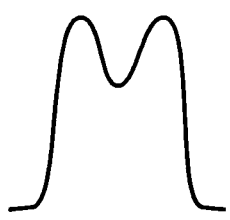
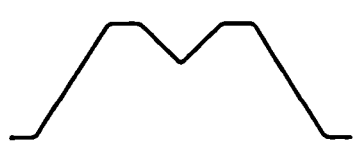
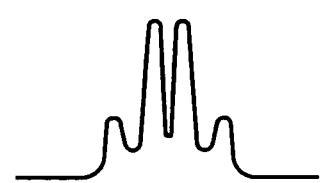
FIG. 4A         FIG. 4B         FIG. 4C ◇ OH absorption loss before exposure to hydrogen
■ Si-E' within MFD
▲ Si-E' in entire fiber ◇ OH absorption loss caused by exposure to hydrogen
■ Si-E' within MFD
▲ Si-E' in entire fiber

METHOD OF MANUFACTURING SINGLE MODE OPTICAL FIBER

CROSS-REFERENCE TO RELATED APPLICATIONS

This application is a divisional of U.S. patent application Ser. No. 10/154,968, filed May 28, 2002, and further is based upon and claims the benefit of priority from the prior Japanese Patent Applications No. 2001-229238, filed Jul. 30, 2001; and No. 2002-083548, filed Mar. 25, 2002, the entire contents of each of which are incorporated herein by reference.

BACKGROUND OF THE INVENTION

1. Field of the Invention

The present invention relates to a silica-based single mode optical fiber used for optical transmission, and a method and apparatus for manufacturing the same.

2. Description of the Related Art

In recent years, vigorous studies has been made for increasing the transmission capacity in optical transmission using an optical fiber made of a silica-based glass.

In order to increase the transmission capacity in optical transmission, it is necessary for the optical fiber performing optical transmission to be capable of a single mode transmission under the wavelength used, because, if a plurality of modes are propagated within the optical fiber, a mode dispersion is unavoidably generated by a difference in the group velocity among propagation modes so as to deteriorate the signal waveform.

Therefore, a single mode optical fiber (SMF) having a zero dispersion wavelength around the wavelength of 1.3 µm has come to be used. Since the optical fiber of this type has a zero dispersion wavelength around the wavelength of 1.3 µm, it has been made possible to achieve optical transmission having the transmission distance exceeding 100 km and several hundreds of Mbps of transmission capacity around the wavelength of 1.3 µm.

On the other hand, it is desirable to carry out optical transmission using a wavelength around 1.55 µm because transmission loss of the optical fiber is rendered smallest around the wavelength noted above. Such being the situation, a dispersion shifted optical fiber (DSF) having a zero dispersion wavelength around the wavelength of 1.55 µm has been developed. The dispersion shifted optical fiber has made it possible to achieve optical transmission having a few Gbps of transmission capacity around the wavelength of 1.55 µm. Also, since this wavelength band is the gain band of an erbium-doped optical fiber amplifier, a drastic increase in the transmission distance has been brought about together with the increase in the transmission capacity.

Also, research and development on wavelength division multiplexing (WDM) optical transmission has been carried out vigorously in recent years as a technology for increasing transmission capacity. In this connection, vigorous studies are also being made of optical fiber that can be used suitably in WDM optical transmission.

Where an optical fiber is used for WDM optical transmission, it is required that the zero dispersion wavelength is not present in the wavelength band that is used in order to prevent four wave mixing. Also, in order to realize a WDM optical transmission system, it is generally required that waveform distortion of the transmitting optical signal that cannot be repaired in the relay point and the light receiving apparatus is not generated. To satisfy this requirement, it is said to be effective to suppress the nonlinear phenomenon caused by optical transmission line and to suppress the accumulated dispersion. Further, if there is a chromatic dispersion difference among the wavelengths of the optical signals, the waveform distortion amount is caused to be different for each wavelength. Therefore, it is necessary to reduce the dispersion slope in optical transmission line as much as possible.

A dispersion shifted optical fiber that does not have zero dispersion in the wavelength band used (NZDSF) has been developed as an optical fiber satisfying the requirements noted above. Four wave mixing scarcely takes place in NZDSF and the nonlinearity of NZDSF is sufficiently low. Therefore, NZDSF is being rapidly introduced and widely spreaded.

Also, a optical transmission line prepared by combining plural kinds of optical fibers so as to make the entire dispersion value and dispersion slope substantially zero has come to be used in many cases in WDM optical transmission systems. The known optical fibers used for this purpose include, for example, a dispersion compensation optical fiber (DCF) and a dispersion slope compensation optical fiber (DSCF).

Further, WDM optical transmission systems using a Raman amplification has also been studied in recent years, and study is also being made of utilizing the wavelength regions other than the wavelengths around 1.3 µm and 1.55 µm in WDM optical transmission.

A phenomenon of increasing transmission loss of optical fiber caused by the combination of a hydrogen molecule with a structural defect within the optical fiber is one of the phenomena obstructing optical transmission noted above. It is known in the art that the increase of transmission loss is caused by the absorption peak generated around the wavelength of 1.24 µm, around the wavelength of 1.38 µm, around the wavelength of 1.38 µm and on the longer wavelength sides thereof.

The particular phenomenon will now be described. In general, paramagnetic defects are present in an optical fiber. Among these paramagnetic defects, the non bridging oxygen hole center (NBOHC) and the per-oxy radical (POR) are said to affect the transmission characteristics, particularly, the long term stability of transmission loss.

The NBOHC noted above is a paramagnetic defect species that one of the four oxygen atoms combined with a Si atom has an unpaired electron that does not contributes to the combination with another atom, as shown in FIG. 1A. On the other hand, the POR noted above is a paramagnetic defect species that one of the four oxygen atoms combined with a Si atom is combined with another oxygen atom having an unpaired electron that does not contributes to the combination with another atom, as shown in FIG. 1B.

Particularly, if hydrogen is diffused in the optical fiber, the diffused hydrogen molecules are combined with these paramagnetic defects so as to generate an atomic combination generating the absorption peak within the transmission wavelength band. As a result, transmission loss is increased.

Particularly, in the case of using the Raman amplification system, the pumping light has a wavelength shorter than that of the amplified light by about 100 nm. For example, where a so-called "S-band" in the vicinity of 1,500 nm, which is outside of a gain wavelength band in the signal light amplifying system using an erbium-doped fiber (EDF), is amplified and utilized in the Raman system, the wavelength of the pumping light becomes 1,400 nm. This gives rise to the problem that, since the wavelength of 1,400 nm noted above is included in the wavelength region of so-called "OH absorption" falling within a range of between 1385 nm and 1410 nm, the pumping light is attenuated in the case where the OH absorption loss is large, resulting in failure to obtain a desired Raman gain.

Further, where the hydrogen molecules are diffused in the fiber, a problem is generated if a large amount of the NBOHC noted above is present in a region inside the mode field diameter (MFD region). Specifically, since the NBOHC reacts with the hydrogen molecule so as to form an OH radical, the OH absorption loss is increased with time so as to greatly impair the reliability of the system. The amount of such increase in the OH absorption loss is not mentioned in any international standard nowadays. However, the target value of the amount of such increase in the OH absorption loss is said to be 0.05 dB/km.

An example of an optical fiber in which the resistance to hydrogen is taken into account for suppressing the phenomenon of increasing transmission loss referred to above is disclosed in U.S. Pat. No. 6,131,415. It is disclosed that the hydrogen ion concentration is lowered in order to decrease transmission loss in the wavelength of 1385 nm, thereby making it possible to achieve optical transmission over the entire wavelength range of 1,200 nm to 1,600 nm.

Also, other examples of optical fibers in which the resistance to hydrogen is taken into account are disclosed in U.S. Pat. No. 5,838,866 and U.S. Pat. No. 6,128,928. It is disclosed that such an amount of germanium as not to substantially increase the refractive index is added to the inner cladding region positioned adjacent to the core so as to improve the resistance to hydrogen.

However, any of these U.S. Patent specifications does not refer at all to, for example, the density of the paramagnetic defect such as the NBOHC or the POR within the optical fiber and, thus, the allowable limit of the density or the like of the paramagnetic defect in the optical fiber remains unclear.

Further, the prior art relating to the technology for decreasing the initial loss of the optical fiber or for maintaining the mechanical strength by improving the fiber drawing method is disclosed in, for example, Jpn. Pat. KOKAI Publication No. 2001-192228 and Jpn. Pat. Publication No. 2001-114526.

BRIEF SUMMARY OF THE INVENTION

An object of the present invention is to provide an optical fiber excellent in hydrogen resistance characteristics and high in long term reliability.

Another object of the present invention is to provide a method of manufacturing an optical fiber excellent in hydrogen resistance characteristics and high in long term reliability.

Further, still another object of the present invention is to provide an apparatus for manufacturing an optical fiber excellent in hydrogen resistance characteristics and high in long term reliability.

According to a first aspect of the present invention, there is provided a single mode optical fiber formed of a silica-based glass and including a glass part consisting of a central core and a cladding region, wherein density of non bridging oxygen hole centers in the glass part as a value of spin density measured by an electron spin resonance method is not higher than $1.0 \times 10^{14}$ spins/g.

According to a second aspect of the present invention, there is provided a single mode optical fiber formed of a silica-based glass and including a glass part having a central core and a cladding region, wherein at least one element selected from the group consisting of Ge and F is added to the glass part, the glass part has an outer diameter of about 125 μm, and density of non bridging oxygen hole centers included in the MFD region is lower than density of non bridging oxygen hole centers included in the cladding region positioned outside the MFD region.

According to a third aspect of the present invention, there is provided a single mode optical fiber formed of a silica-based glass and including a glass part consisting of a central core and a cladding region, wherein at least one element selected from the group consisting of Ge and F is added to the glass part, the glass part has an outer diameter of about 125 μm, and fictive temperature obtained by a ratio of a defect line denoting a three-membered ring structure of the glass to a defect line denoting a four-membered ring structure, which is obtained by measuring deviation between the Rayleigh scattering line and Raman scattering line, is not higher than 1,200° C.

According to a fourth aspect of the present invention, there is provided a method of manufacturing a single mode optical fiber formed of a silica-based glass and including a glass part having a central core and a cladding region, wherein at least one element selected from the group consisting of Ge and F is added to the glass part, and the glass part has an outer diameter of about 125 μm, comprising heating an optical fiber preform so as to melt the optical fiber preform; fiber drawing an optical fiber from the molten optical fiber preform; and continuously cooling the molten optical fiber preform starting with the meniscus portion in which the diameter is decreased from 90% of the preform diameter to 5% of the preform diameter to the portion where the drawn optical fiber has a temperature of 1,200° C. at a cooling rate of 1,000 to 3,000° C./sec.

Further, according to a fifth aspect of the present invention, there is provided an apparatus for manufacturing an optical fiber, comprising a heating furnace for heating an optical fiber preform, the heating furnace including a first heater; and a mechanism for fiber drawing an optical fiber from the optical fiber preform that is melted within the heating furnace, wherein a lower cylinder having a length $L_1$ meeting the inequality given below is arranged in contact with the bottom end side of the heating furnace, and the optical fiber is continuously cooled within the lower cylinder such that the meniscus portion of the drawn optical fiber, in which the diameter of the optical fiber preform melted within the fiber drawing furnace is decreased from 90% of the preform diameter to 5% of the preform diameter, has a length not smaller than "A×5'"" where A represents the diameter (mm) of the preform:

$$L_1 \text{ (mm)} > B \times B / 300$$

where B represents the drawing speed (m/min) of the optical fiber.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention, and together with the general description given above and the detailed description of the preferred embodiments given below, serve to explain the principles of the present invention.

FIGS. 1A, 1B and 1C show the NBOHC, the POR and the Si (D)-E', respectively, which are included in the paramagnetic defects of the optical fiber;

FIGS. 2A to 2D show various examples of the refractive index profile of a single mode optical fiber according to one embodiment of the present invention;

FIGS. 3A and 3B show the other examples of the refractive index profile of a single mode optical fiber according to one embodiment of the present invention;

FIGS. 4A, 4B and 4C show the light emission intensity distributions in the vicinity of the wavelength of 650 nm in a cross section of an optical fiber measured by a cathode luminescence method for samples SM1, SM2 and NZ1, respectively;

DETAILED DESCRIPTION OF THE INVENTION

Figure 5:
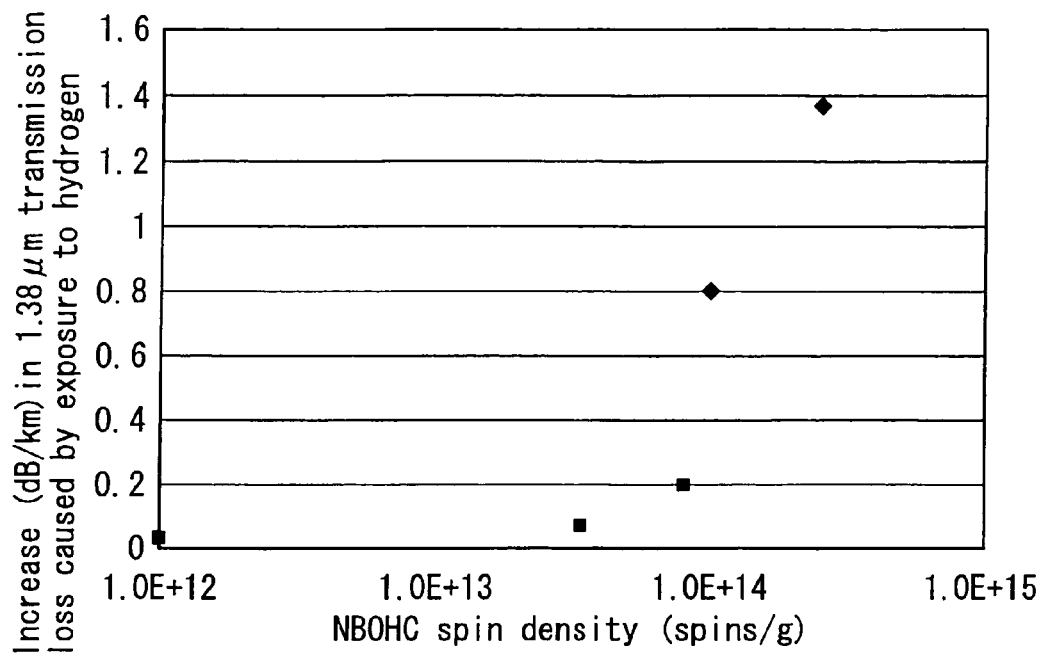
FIG. 5 is a graph showing the relationship between the result of the measurement of the NBOHC density in the vicinity of MFD and the amount of OH absorption increase at 1.38 μm.

Various embodiment of the present invention will now be described in more detail.

A single mode optical fiber according to a first embodiment of the present invention is featured in that density of non bridging oxygen hole center (NBOHC) is not higher than $1.0 \times 10^{14}$ spins/g in terms of spin density measured by an electron spin resonance method. The lower limit of the spin density, which is not particular limited, is generally about $1.0 \times 10^{11}$ spins/g.

If the density of NBOHC exceeds $1.0 \times 10^{14}$ spins/g, transmission loss is increased in the vicinity of the wavelength of 1.52 μm when hydrogen molecules are diffused and impregnated in the optical fiber.

In the single mode optical fiber according to the first embodiment of the present invention, it is desirable for the density of the paramagnetic defect Si (D)-E' in the glass part to be not lower than $1.0 \times 10^{12}$ spins/g in terms of spin density measured by an electron spin resonance method. If the density of Si (D)-E' is not lower than $1.0 \times 10^{12}$ spins/g, it is possible to further prevent the increase in transmission loss in the vicinity of the wavelength of 1.38 μm.

In the present invention, the density of the paramagnetic defect such as the NBOHC or the Si (D)-E' remaining within the optical fiber is defined by the value of the spin density measured by the electron spin resonance (ESR) method, as described above.

The Si (D)-E' noted above represents the paramagnetic defect species that two oxygen atoms and a deuterium atom are combined with a Si atom, and the Si atom has an unpaired electron that does not contribute to the combination with another atom, as shown in FIG. 1C.

In the single mode optical fiber according to the first embodiment of the present invention, it is possible for the light emission intensity in the vicinity of the wavelength of 650 nm in a cross section of the glass part, which is measured by a cathode luminescence method, to be distributed such that the intensity is strongest in the annular region in the outside and vicinity of an outer circumferential portion of the central core and is gradually decreased toward the outside. If the distribution of the light emission intensity is defined as described above, it is possible to prevent an increase in transmission loss in the vicinity of the wavelength of 1.52 μm under the influence of the atomic bond including hydrogen.

In the single mode optical fiber according to the first embodiment of the present invention, it is possible to add germanium to central core. Also, it is possible to add fluorine to the annular region positioned adjacent to the central core of the glass part. Further, it is possible to make the chlorine concentration in the cladding region higher than the chlorine concentration in the central core.

It is desirable to add germanium to the central core, to add fluorine to the annular region positioned adjacent to the central core and to make the chlorine concentration in the cladding region higher than the chlorine concentration in the central core in view of the effect of decreasing the glass structural defects that increases transmission loss of the optical fiber.

It is possible to manufacture the single mode optical fiber according to the first embodiment of the present invention described above by diffusing deuterium in the glass part so as to decrease the spin density of the NBOHC and, thus, to increase the spin density of the peroxy radical. If deuterium is diffused as a hydrogen resistance treatment, the spin density of the NBOHC is decreased and the spin density of the peroxy radical is increased so as to make it possible to obtain a single mode optical fiber that is free from an increase in transmission loss caused by hydrogen diffusion, as described above.

A single mode optical fiber according to a second embodiment of the present invention is featured in that the density of the NBOHC contained in the MFD region of the glass part is lower than the NBOHC density contained in the cladding region outside the MFD region. It is possible to improve the hydrogen resistance characteristics of the optical fiber by lowering the density of the NBOHC in the region through which the light is propagated as described above.

In the single mode optical fiber according to the second embodiment of the present invention, it is desirable for the density of the NBOHC contained in a region having a radius of 25 μm from the center of the glass part to be not higher than $1.0 \times 10^{13}$ spins/g in terms of a value of the spin density measured by the electron spin resonance method. The lower limit of the spin density, which is not particularly limited, is generally about $1.0 \times 10^{11}$ spins/g.

If the density of the NBOHC exceeds $1.0 \times 10^{13}$ spins/g, transmission loss is increased in the vicinity of the wavelength of 1.52 μm when hydrogen molecules are diffused and impregnated in the optical fiber.

In the single mode optical fiber according to the second embodiment of the present invention, it is desirable for the chlorine concentration in the cladding region to be not lower than 1,000 ppm. The upper limit of the chlorine concentration, which is not particularly limited, is generally about 10,000 ppm.

In the single mode optical fiber according to the second embodiment of the present invention, it is desirable for the density of the paramagnetic defect Si-E' contained in the glass part to be not lower than $5 \times 10^{13}$ spins/g in terms of spin density measured by an electron spin resonance method. The upper limit of the spin density, which is not particularly limited, is generally about $1\times10^{15}$ spins/g.

If the chlorine concentration in the cladding region and the density of the paramagnetic defect Si-E' contained in the glass part are defined as described above, it is possible to lower the OH absorption loss of 1.38 μm before exposure to hydrogen so as to decrease the increase in the OH absorption loss of 1.38 μm caused by the exposure to hydrogen.

In the single mode optical fiber according to the second embodiment of the present invention, it is desirable for the increase in the loss other than the increase in the loss caused by the hydrogen molecules diffused in the glass part after exposure to hydrogen gas of 1 atm. at room temperature to be not higher than 0.1 dB/km in the wavelength region of 1.38 μm to 1.42 μm.

A single mode optical fiber according to a third embodiment of the present invention is featured in that the fictive temperature obtained from a ratio of a defect line denoting a three-membered ring structure to a defect line denoting a four-membered ring structure, which is obtained by allowing a transmitting light to be incident in the central region of the MFD region of the glass part and by measuring a deviation between Rayleigh scattering line and Raman scattering line, is not higher than 1,200° C. The lower limit of the fictive temperature, which is not particularly limited, is generally about 1,000° C. The amount of increase in the OH absorption loss of 1.38 μm caused by the exposure to hydrogen can be lowered by setting the fictive temperature at 1,200° C. or lower.

In the single mode optical fiber according to the third embodiment of the present invention, it is desirable for the increase in the loss other than the increase in the loss caused by the hydrogen molecules diffused in the glass part after exposure to a hydrogen gas of 1 atm at room temperature to be not higher than 0.05 dB/km in the wavelength range of 1.38 μm to 1.42 μm.

A method of manufacturing a single mode optical fiber according to a fourth embodiment of the present invention is featured in that the method comprises the step of continuously cooling that region which ranges between the meniscus portion and the portion of 1,200° C. of the drawn optical fiber at a cooling rate of 1,000 to 3,000° C./second. The hydrogen resistance of the optical fiber can be improved by continuously cooling the meniscus portion et seq. to a prescribed temperature at a prescribed cooling rate as defined above.

In the method of manufacturing a single mode optical fiber according to the fourth embodiment of the present invention, it is desirable for the optical fiber preform to be a silica-based glass soot obtained by a flame hydrolysis method and for the soot to be sintered under the condition substantially free from oxygen.

An apparatus for manufacturing a single mode optical fiber according to a fifth embodiment of the present invention is featured in that a lower cylinder having a length $L_1$ meeting a prescribed relationship with the drawing speed of the optical fiber is arranged in contact with the bottom end side of a heating furnace, and the optical fiber is continuously cooled within the lower cylinder such that the meniscus portion of the drawn optical fiber preform which is melted within a fiber drawing furnace has a length not smaller than "A×5" where A represents the diameter (mm) of the preform.

It is possible to realize the cooling step included in the method according to the fourth embodiment of the present invention by employing the particular apparatus construction described above.

In the apparatus for manufacturing a single mode optical fiber according to the fifth embodiment of the present invention, a second heater for heating the optical fiber withdrawn from within the heating furnace is arranged within the lower cylinder. It is desirable for the length $L_2$ of the second heater to satisfy the inequality given below:

$$L_2 > B \times C/200$$

wherein B represents the diameter (mm) of the optical fiber preform, and C represents the drawing speed (m/min) of the optical fiber.

It is also desirable for the distance $L_3$ between the top end side of the first heater and the top end side of the heating furnace to meet the inequality given below and for the distance $L_4$ between the top end side of the first heater and the top end side of the heating furnace to meet the inequality given below:

$$L_3 > B \times C/200$$

$$L_4 > B \times C/200$$

wherein B represents the diameter (mm) of the optical fiber preform, and C represents the drawing speed (m/min) of the optical fiber.

Incidentally, the single mode optical fiber in the present invention represents an optical fiber capable of a single mode operation under a used wavelength band containing the SMF, DSF, NZDSF and DCF referred to previously.

An embodiment of the present invention will now be described with reference to the accompanying drawings.

FIGS. 2A to 2D show various examples of the refractive index profile of the single mode optical fiber according to the first embodiment of the present invention. A desired refractive index profile can be obtained by adding various elements to silica. Where the refractive index is increased to a level higher than that of the substantially pure silica, it is possible to add Ge, and where the refractive index is lowered, it is possible to add F. Incidentally, it is also possible to add both Ge and F simultaneously so as to obtain a desired refractive index profile.

In the refractive index profile shown in FIG. 2A, the refractive index of the central core 11 is higher than that of the cladding region 12. The optical fiber having the particular refractive index profile comprises the central core 11 formed of silica doped with Ge and the cladding region 12 formed of a substantially pure silica. Also, the chlorine concentration in the cladding region 12 is higher than that in the core 11. To be more specific, the chlorine concentration in the central core 11 is set at 700 to 1,300 ppm, and the chlorine concentration in the cladding region 12 positioned outside the core 11 is set at 1,500 to 3,000 ppm.

In the refractive index profile shown in FIG. 2B, the refractive index of the central core 21 is higher than that of the cladding region 23, and the refractive index of an annular region 22 is lower than that of the cladding region 23. It should be noted that the optical fiber having the particular refractive index profile comprises the central core 21 formed of silica doped with Ge, the annular region 22 formed of silica doped with a small amount of F, and the cladding region 23 formed of a substantially pure silica. The chlorine concentration in each of the annular region 22 and the cladding region 23 is higher than that in the central core 21. Specifically, the chlorine concentration in the central core 21 is set at 700 to 1,300 ppm, and the chlorine concentration in each of the annular region 22 and the cladding region 23 positioned outside the central core 21 is set at 1,500 to 3,000 ppm.

In the refractive index profile shown in FIG. 2C, the refractive index of each of a central core 31 and a second annular region 33 is higher than that of a cladding region 34. The optical fiber having the particular refractive index profile comprises the central core 31 formed of silica doped with Ge, the first annular region 32 formed of silica doped with F, the second annular region 33 formed of silica doped with Ge, and the cladding region 34 formed of a substantially pure silica.

FIG. 2C shows that the refractive index of the first annular region 32 is lower than that of the cladding region 34. However, it is not absolutely necessary for the refractive index of the first annular region 32 to be lower than that of the cladding region 34. It is possible for the refractive index of the first annular region 32 to be substantially equal to that of the cladding region 34, as shown in FIG. 3A.

In the refractive index profile shown in FIG. 2D, a first annular region 42, a second annular region 43 and a third annular region 44 are interposed between a central core 41 and a cladding region 45. The refractive index of each of the central core 41 and the second annular region 43 is higher than that of the cladding region 45, and the refractive index of each of the first annular region 42 and the third annular region 44 is lower than that of the cladding region 45.

FIG. 2D shows that the refractive index of the first annular region 42 is lower than that of the cladding region 45. However, it is not absolutely necessary for the refractive index of the first annular region 42 to be lower than that of the cladding region 45. It is possible for the refractive index of the first annular region 42 to be substantially equal to that of the cladding region 45.

Incidentally, in FIGS. 2A to 2D referred to above, the outer diameter of the single mode optical fiber falls within a range of 125 μm±3 μm. Also, the outer diameter of each of the central cores 11 and 21 is 7.5 to 9.5 μm, and the outer diameter of each of the central cores 31 and 41 is 3 to 5 μm. The outer diameter of the annular region 22 is 3 to 6 times as large as the outer diameter of the central core 21. The outer diameter of the annular region 32 is 1.5 to 3.5 times as large as the outer diameter of the core 31, and the outer diameter of the annular region 33 is 1.2 to 2.5 times as large as the outer diameter of the annular region 32. Further, the outer diameter of the annular region 42 is 1.5 to 3.5 times as large as the outer diameter of the central core 41, and the diameter of the annular region 43 is 1.2 to 2.5 times as large as the outer diameter of the annular region 42. Still further, the outer diameter of the annular region 44 is 1.05 to 2 times as large as the outer diameter of the annular region 43.

In the single mode optical fiber having the refractive index profile as shown in FIGS. 2A to 2D and FIGS. 3A and 3B, the so-called "MFD" falls in general within a range of, for example, between 4 μm and 12 μm, though the MFD differs according to the required fiber characteristics. In general, the range within which the light is propagated is generally 2 to 3 times as much as the range of the MFD, the range affecting the transmission characteristics, particularly transmission loss, is considered to be not larger than the diameter of about 50 μm in the ordinary optical fiber in which the glass part has a diameter of about 125 μm.

Then, the increase in hydrogen loss and the increase in OH loss were examined and the ESR measurement was performed in respect of samples of single mode optical fibers having the refractive index profiles shown in FIGS. 2A to 2C. Table 1 shows the results. Incidentally, blanks of the spin density included in Table 1 denote that the spin density was on the order of $10^{12}$, which was not higher the detection level of the ESR signal.

TABLE 1

| Sample No. | Kind | Treatment for hydrogen resistance | Increase of 1.52 μm absorption | Increase of 1.38 μm absorption | Si (D)-E' (spins/g) | NBOHC (spins/g) | POR (spins/g) |
|---|---|---|---|---|---|---|---|
| SM1 | SMF | x | Increased | Increased | — | 1.1E+14 | — |
| SM1D | SMF | o | None | None | 1.9E+13 | — | 4.9E+13 |
| SM2 | SMF | x | Increased | Increased | — | 1.2E+14 | — |
| SM2D | SMF | o | None | None | 1.8E+13 | — | 2.3E+13 |
| SM3 | SMF | x | None | Increased | — | 7.9E+13 | — |
| SM4 | SMF | x | None | Increased | — | 7.3E+13 | — |
| SM5 | SMF | x | None | Increased | — | 5.9E+13 | — |
| SM6 | SMF | x | None | Increased | — | 9.2E+13 | — |
| SM7 | SMF | x | None | None | — | — | — |
| SM8 | SMF | x | None | None | — | — | — |
| NZ1 | ZDF | x | None | Increased | — | 3.4E+13 | — |
| NZ1D | NZDSF | o | None | None | 2.2E+13 | — | 2.7E+13 |

Note:
Blanks of the spin density (spins/g) denote that the spin density was lower than 1.0E+12 and, thus, was incapable of being detected.

Samples SM1 to SM6 shown in Table 1 represent optical fibers having the refractive index profile as shown in FIG. 2A. Samples SM7 and SM8 represent optical fibers having the refractive index profile as shown in FIG. 2B. Further, samples NZ1 to NZ2 represent optical fibers having the refractive index profile as shown in FIG. 2C.

Also, the treatment for hydrogen resistance shown in Table 1 denotes the treatment that the sample was held in a deuterium gas atmosphere for a prescribed time so as to diffuse the deuterium molecules into the optical fiber. The mark "○" in this column denotes that the sample was subjected to the treatment for hydrogen resistance, with the mark "x" denoting that the treatment for hydrogen resistance was not applied to the sample.

The column of "increase of 1.52 μm absorption" is also included in Table 1. This column indicates the increase in transmission loss derived from the Si—H bond, i.e., a so-called "increase of hydrogen loss". The indication of "increased" in Table 1 denotes that increase of 1.52 μm absorption was recognized when the sample was exposed to a hydrogen gas atmosphere for a prescribed time under room temperature, with the indication "none" denoting that increase of 1.52 μm absorption was not recognized.

The column of "increase of 1.38 μm absorption" is also included in Table 1. This column indicates the increase in transmission loss derived from the Si—OH bond, i.e., a so-called "increase of OH loss". The indication of "increased" in Table 1 denotes that increase of 1.52 μm absorption was recognized when the sample was exposed to a hydrogen gas atmosphere for a prescribed time under room temperature, with the indication "none" denoting that increase of 1.52 µm absorption was not recognized.

The result of the ESR measurement for each sample SMF in Table 1 was as follows.

Specifically, in sample SM1, both the increase of hydrogen loss and the increase of OH loss were recognized, and the spin density of the NBOHC defect was found to be $1\times10^{14}$ spins/g, arriving at the order of $10^{14}$.

Sample SM1D was prepared by applying the treatment for the hydrogen resistance to an optical fiber equal to sample SM1. In sample SM1D, any of the increase of hydrogen loss and the increase of OH loss was not substantially recognized, and the ESR signal for the NBOHC defect was not detected. Further, the spin density of the POR defect was found to be $4.9\times10^{13}$ spins/g. Still further, a signal of "Si (D)-E'" of the paramagnetic defect species having deuterium combined thereto was detected in sample SM1D.

Sample SM2 and sample SM2D having the treatment for hydrogen resistance applied to sample SM2 exhibited results similar to those of sample SM1 and sample SM1D, respectively. Specifically, in sample SM2, both the increase of hydrogen loss and the increase of OH loss were recognized, and the spin density of the NBOHC defect was found to be $1.2\times10^{14}$ spins/g. On the other hand, in sample SM2D, any of the increase of hydrogen loss and the increase of OH loss was not substantially recognized. Further, the spin density of the POR defect was found to be $2.3\times10^{13}$ spins/g. Still further, a signal of "Si (D)-E'" was detected in sample SM2D.

In samples SM3 to SM6, an increase of OH loss was recognized, though an increase of hydrogen loss was not recognized. Also, the spin density of the NBOHC defect for these samples was on the order of $10^{13}$. Further, a signal indicating the POR defect was not detected.

In samples SM7 and SM7, any of the increase of hydrogen loss and the increase of OH loss was not recognized, and any of a signal indicating the NBOHC defect and a signal indicating the POR defect was not detected.

The results of the ESR measurement described above indicate that, if the spin density of the NBOHC defect is increased to reach the order of $10^{14}$, the increase of hydrogen loss and the increase of OH loss are recognized.

It is also indicated that, where the spin density of the NBOHC defect is on the order of $10^{13}$, the increase of OH loss is recognized, though the increase of hydrogen loss is not recognized.

Further, where the spin density of the NBOHC defect is not high enough to be detected, i.e., on the order of $10^{12}$ or less, any of the increase of hydrogen loss and the increase of OH loss is not recognized.

The phenomenon itself that the hydrogen resistance characteristics can be improved by the application of the treatment for the hydrogen resistance utilizing the diffusion of the deuterium molecules is known in the art. However, a signal indicating the Si (D)-E' defect was detected from an optical fiber having the particular treatment applied thereto and, thus, exhibiting resistance to hydrogen.

The results of measurement of NZDSF shown in Table 1 will now be described.

Sample NZ1 represents an optical fiber having an Aeff of 75 µm² and having a negative dispersion value of about several ps/nm/km in 1.55 µm band. The spin density of the NBOHC defect was $3.4\times10^{13}$ spins/g, i.e., on the order of $10^{13}$, and an increase of OH loss was recognized, though an increase of hydrogen loss was not recognized. Further, sample NZ1 was found to coincide with samples SM3 to SM6 for the case of SMF described previously in the hydrogen resistance characteristics.

In sample NZ1D having the treatment for the hydrogen resistance applied thereto, the ESR signal denoting the NBOHC defect was not detected, and the spin density of the POR defect was found to be $2.7\times10^{13}$ spins/g, with the result that any of the increase of hydrogen loss and the increase of OH loss was not recognized. Further, a signal of "Si (D)-E'" of the paramagnetic defect species having deuterium combined thereto was detected in the sample NZ1D as in the sample SM1D referred to previously.

The light emission intensity distribution in the vicinity of the wavelength of 650 nm within a cross section of an optical fiber, which is measured by the cathode luminescence method, will now be described.

The cathode luminescence method is an analytical method for analyzing the defect species and the density thereof or the stress from the wavelengths and intensities of an ultraviolet light, a visible light or a near infrared light that is emitted when an electron beam impinges on an object. It is known in the art that the light emission in the vicinity of the wavelength of 650 nm is due to the NBOHC. The NBOHC distribution within a cross section of an optical fiber was examined by using the described technology, with the results as shown in FIGS. 4A to 4C.

FIGS. 4A to 4C show the situations given below:

(1) FIG. 4A shows the light emission intensity distribution of sample SM1, which is an example of an optical fiber having the refractive index profile shown in FIG. 2A.

As apparent from FIG. 4A, the light emitted from sample SM1 has the highest intensity in the boundary portion (mode field periphery portion) between the central core 11 and the cladding region 12, and the intensity is rapidly weakened on the outside of the central core 11. Also, the intensity of the emitted light in the central region of the central core 11 is weaker than that in the outer peripheral portion of the central core 11, and the intensity of the emitted light is further weakened in the cladding region 13.

Also, the distance (radius) R of the point, which exhibits the highest intensity of the emitted light, from the center of the optical fiber falls within a range of between 3 µm and 4.5 µm in the case where the central core 11 has an outer diameter in the range of 7.5 µm to 9.5 µm, i.e., 3 µm<R<4.5 µm. On the other hand, the distance r of the point outside the point of distance R, which exhibits 20% of the highest intensity of the light emitted from the point of distance R, from the center of the optical fiber falls within a range of between 5 µm and 6 µm in the case where the central core 11 has an outer diameter in the range of 7.5 µm to 9.5 µm, i.e., 5 µm <r <6 µm. In other words, the intensity of the light emission is rapidly lowered if the distance from the center of the optical fiber exceeds the distance of the point of distance R from the center of the optical fiber.

In the optical fiber of sample SM1 noted above, the NBOHC is concentrated in the mode field peripheral portion as pointed out above. Also, as apparent from Table 1, the NBOHC can be detected by the measurement by ESR. It follows that the optical fiber leaves room for further improvement in respect of the resistance to hydrogen.

(2) FIG. 4B shows the light emission intensity distribution of sample SM7, which is an example of an optical fiber having the refractive index profile shown in FIG. 2B.

As apparent from FIG. 4B, the light emitted from sample SM7 has the highest intensity in the annular region 22 and in the boundary portion (mode field peripheral portion) between the annular region 22 and the cladding region 23, and the intensity is moderately weakened, compared with the graph of FIG. 4A, on the outside of the annular region 22. Also, the intensity of the emitted light in the central region of the central core 21 is weaker than that in the mode field peripheral portion, and the intensity of the emitted light is further weakened in the cladding region 23.

Also, the distance (radius) R of the point, which exhibits the highest intensity of the emitted light, from the center of the optical fiber falls within a range of between 4 µm and 6 µm in respect of the annular region 22 having the inner and outer diameters described previously, i.e., 4 µm<R<6 µm. On the other hand, the distance r of the point outside the point of distance R, which exhibits 20% of the highest intensity of the light emitted from the point of distance R, from the center of the optical fiber falls within a range of between 9 µm and 15 µm in respect of the annular region 22 having the inner and outer diameters described previously, i.e., 9 µm<r<15 µm. In other words, the intensity of the light emission is moderately lowered if the distance from the center of the optical fiber exceeds the distance of the point of distance R from the center of the optical fiber.

In the optical fiber of sample SM7 noted above, the NBOHC is not concentrated in the mode field peripheral portion as pointed out above. Also, as apparent from Table 1, the NBOHC cannot be detected by the measurement by ESR. It follows that the optical fiber is free from the problem in terms of the resistance to hydrogen.

(3) FIG. 4C shows the light emission intensity distribution of sample NZ1, which is an example of an optical fiber having the refractive index profile shown in FIG. 2C.

As apparent from FIG. 4C, the intensity of the light emission from the sample NZ1 is strong in the annular region 32 (the refion having a low refractive index within MFD) to which F is added, and weak in the central core 31, to which Ge is added, and in the annular region 33 (the region having a high refractive index within MFD). Also, the intensity of the light emission is weakest in the cladding region 34 to which none of F and Ge is added. This was also the case with a sample NZ1D to which the treatment for the hydrogen resistance was applied.

It should be noted that, in samples SM1D and SM2D to which the treatment for the hydrogen resistance was applied, the light emission of NBOHC was recognized, though the NBOHC was not detected by the ESR. What should be noted is that, even in the optical fiber in which the NBOHC was not detected by the ESR because of the treatment for the hydrogen resistance, the light emission of the NBOHC can be observed in the cathode luminescence method.

The reasons for the situation described above are considered to be as follows:

(a) The sensitivity of the cathode luminescence method is higher than that of the ESR.

(b) The cathode luminescence method reflects the portion where there is a residual stress and the portion where the glass structure is weak in a cross section of the optical fiber, though the ESR cannot detect the described portion.

Incidentally, the results of the measurement of the light emission intensity distribution by the cathode luminescence method, which are shown in FIG. 4A to 4C, merely represent the relative comparison of the light emission intensity distribution in a cross section of the optical fiber and do not provide the indexes for the absolute comparison of the light emission intensity distribution among different optical fibers. The actual comparison of the spin densities of the NBOHC is performed by using numeral values obtained from the results of the measurement by the ESR method.

The following conclusions can be obtained from the result of the measurement by the ESR method and the result of the observation of the light emission intensity distribution by the cathode luminescence method:

(1) The increase of hydrogen loss and the increase of OH loss are included in the problems in terms of the resistance to hydrogen. Where the density of the NBOHC exceeds $1.0 \times 10^{14}$ spins/g in terms of a value of the spin density obtained by the ESR method, the increase of hydrogen loss and the increase of OH loss are generated. It follows that, in order to obtain an optical fiber free from the increase of hydrogen loss and the increase of OH loss, it is necessary for at least the spin density of the NBOHC to be not higher than $1.0 \times 10^{14}$ spins/g.

(2) Where the spin density of the NBOHC is not higher than $1.0 \times 10^{14}$ spins/g, it is possible for the increase of OH loss to be generated, though the increase of hydrogen loss is not generated. On the other hand, where the spin density of the NBOHC is not higher than $10^{12}$ spins/g, any of the increase of hydrogen loss and the increase of OH loss is not substantially generated. In other words, the condition desirable as the optical fiber, under which any of the increase of hydrogen loss and the increase of OH loss is not generated, is that the spin density of the NBOHC is on the order of $10^{12}$ spins/g or less.

(3) In the optical fiber to which the treatment for the hydrogen resistance is applied, the NBOHC is not detected and, instead, the POR and Si (D)-E' come to be detected. In this case, however, any of the increase of hydrogen loss and the increase of OH loss is not generated. This is also the condition desirable for the optical fiber in which any of the increase of hydrogen loss and the increase of OH loss is not generated.

(4) It is possible to observe the NBOHC distribution in a cross section of the optical fiber by the cathode luminescence method. For example, in the Ge-doped SMF having the refractive index profile shown in FIG. 2A, the light having a wavelength of about 650 nm, which is derived the NBOHC, has the highest intensity in the boundary region between the central core 11 and the cladding region 12, and light intensity is gradually lowered in the central core 11 and the cladding region 12 in the order mentioned.

(5) In the SMF in which the periphery of the Ge-doped core is doped with traces of F so as to achieve the refractive index profile as shown in, for example, FIG. 2B, the emitted light having a wavelength of about 650 nm, which is derived from the NBOHC, exhibits the highest intensity in the annular region 22, which is the F-doped region outside the central core 21, and the light intensity is gradually lowered outward from the central core 21 such that the intensity is rendered lower in the central core 21, which is the Ge-doped portion, and in the cladding region 23 in the order mentioned. In other words, the NBOHC is not concentrated but is dispersed in the mode field peripheral portion and the outside portion thereof in the described optical fiber, compared with the optical fiber having the refractive index profile as shown in FIG. 2A.

The refractive index profile shown in FIG. 2B is advantageous over the refractive index profile shown in FIG. 2A in the hydrogen resistance characteristics.

(6) Further, in the single mode optical fiber having a refractive index profile as shown in, for example, FIG. 2C, i.e., the profile that the first annular region 32 doped with F is formed along the outer circumference of the Ge-doped central core 31, and second annular region 33 doped with Ge is further formed along the outer circumference of the first annular region 32, the emitted light having a wavelength of about 650 nm has a high intensity in the annular region 32, and the light intensity is lowered in the annular region 32 and the cladding region 34 in the order mentioned. Incidentally, the similar phenomenon is generated from the optical fiber having a refractive index profile as shown in FIG. 2D.

It follows that conclusion (1) given above is absolutely required as the condition of the single mode optical fiber having satisfactory hydrogen resistance characteristics, and conclusions (2) and (3) constitute desirable conditions. Also, conclusions (4) to (6) are important as conditions for supporting the conclusions (1) to (3) given above.

A single mode optical fiber according to a second embodiment of the present invention will now be described.

As already pointed out, concerning the improvement of the hydrogen resistance characteristics of the optical fiber, the structural defect of the glass, particularly the structural defect derived from oxygen, is said to be deeply involved in the deterioration of the hydrogen resistance characteristics. Among the structural defect, the structural defect shown in FIG. 1A (non bridging oxygen hole center: NBOHC) is widely known as a paramagnetic defect that can be detected by the ESR method.

Where the NBOHC is present in the fiber, the reaction given below takes place if hydrogen molecules are diffused into the glass so as to generate OH groups:

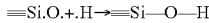

$$\equiv Si.O.+.H \rightarrow \equiv Si\text{—}O\text{—}H$$

As a result, an increase in the OH absorption loss of the wavelength in the vicinity of 1.38 μm takes place.

If a large amount of the NBOHC is present in the MFD or in the vicinity thereof through which the light is propagated, the hydrogen resistance characteristics are considered to be deteriorated. The present inventors have measured the spin density of the NBOHC contained in various optical fibers by the ESR method in respect of the state that the glass has an outer diameter of about 125 μm and the state that the fiber was etched with HF acid so as to decrease the diameter to about 50 μm.

The outer diameter after the etching was set at about 50 μm partly because the present inventors wished to clarify the defect state of the optical waveguide portion (i.e., wished to obtain data free from influences given by the cladding region), and partly because such a fineness was the limit in view of the sample handling in the ESR measuring step.

In the case that the sample was exposed to a hydrogen gas atmosphere of one atmosphere under room temperature so as to diffuse sufficiently the hydrogen molecules into the fiber, the present inventors have also examined the relationship among the wavelength of 1.52 μm or 1.38 to 1.42 μm, the amount of increase in the absorption loss caused by hydrogen, and the spin density measured by ESR method. The experiment in this case covered an optical fiber having a refractive index profile shown in FIG. 2A, i.e., a general single mode optical fiber.

Table 2 shows the results of the ESR measurement and the behavior of transmission loss caused by hydrogen.

TABLE 2

| No. | 1.52 μm absorption | Increase of 1.38 μm absorption | Spin density (spins/g) NBOHC |
|---|---|---|---|
| SM9 | Absorbed | 1.36 | 1.1E+14 |
| SM9E | | | 2.5E+14 |
| SM10 | Absorbed | 0.82 | 1.2E+1.4 |
| SM10E | | | 9.6E+13 |
| SM11 | None | 0.19 | 6.1E+13 |
| SM11E | | | 7.9E+13 |
| SM12 | None | 0.08 | 9.5E+12 |
| SM12E | | | 3.4E+12 |
| SM13 | None | 0.03 | 1.2E+12 |
| SM13E | | | ND |

In Table 2, the sample number accompanied with a letter "E", e.g., SM9E, represents the sample having the outer diameter decreased to about 50 μm by the etching with HF acid. On the other hand, the sample number without the letter "E" represents the sample before the etching treatment and, thus, having an outer diameter of about 125 μm. Also, the unit of the increase of the 1.38 μm absorption is "dB/km".

The 1.52 μm absorption is said to be due to the combination between a hydrogen molecule and a peroxy radical (=Si—O—O.). However, other causes are also conceivable. Even now, there is no established theory. In this experiment, the value of loss before exposure to hydrogen was compared with the value of loss after exposure, and the sample in which an absorption peak was recognized in the wavelength is indicated as "absorbed", and the sample in which the absorption peak was not recognized is indicated as "none".

The 1.38 μm absorption is caused by the OH group formed by the reaction between the hydrogen molecule diffused into the fiber and the NBOHC, and the difference in the loss between before the exposure to the hydrogen and after the exposure is indicated in Table 2 as the amount of increase. Incidentally, the NBOHC spin density of "ND" shown in Table 2 denotes that the spin density in the ESR apparatus used for the measurement and under the measuring conditions was not higher than the detection limit of $1 \times 10^{12}$ spins/g.

The samples were prepared as follows.

Sample SM9: A cladding region was formed in a different process on the core prepared by a VAD method. In the sintering process of the porous body into the core rod, 1% of oxygen was allowed to be present in the atmosphere gas so as to forcedly form a glass having an excessively high oxygen content.

The preform having an outer diameter of 80 mm was subjected to a fiber drawing by using a fiber drawing apparatus shown in FIG. 8 referred to herein later with the fiber drawing speed set at 1,000 m/min and the highest temperature of the fiber drawing furnace set at 2,050° C. In this case, the slow cooling section had a length of 1,500 mm, and the meniscus length was 350 mm.

Sample SM10: The sample was prepared by the process equal to that for preparing the sample SM9. However, the fiber drawing speed was set at 500 m/min, and the highest temperature of the fiber drawing furnace was set at 1,950° C. Further, the meniscus length was 350 mm.

Sample SM11: The sample was prepared by the process same as the sample SM9. However, oxygen was not present in the step of making the core porous body transparent.

Sample SM12: The sample was prepared by the process same as the sample SM10. However, oxygen was not present in the step of making the core transparent.

Sample SM13: The preform was prepared by the process equal to that for sample SM12. The fiber drawing speed was set at 500 m/min, and the highest temperature of the fiber drawing furnace was set at 1,950° C. However, the flow of the gas within the furnace was controlled so as to increase the meniscus length to 420 mm.

The result of the manufacturing processes of the samples can be summarized as follows.

(1) If the treatment to make the core porous body transparent is carried out under such an atmosphere which contains oxygen gas, the 1.52 μm absorption is generated by the exposure to hydrogen. On the other hand, the 1.52 μm absorption is not generated by the exposure to hydrogen if the treatment to make the core porous body transparent is carried out under an atmosphere free from oxygen.

The experimental data conforms with the general idea that the 1.52 μm absorption tends to be generated in the glass containing an excessively large amount of oxygen. It is considered reasonable to understand that the 1.52 μm absorption can be prevented if the glass is prepared not to contain an excessively large amount of oxygen.

In the following description, an emphasis is placed on the OH absorption of the wavelength of 1.38 μm without referring to the 1.52 μm absorption.

(2) FIG. 5 is a graph showing the relationship between the NBOHC density in the vicinity of the MFD measured after the HF etching and the amount of increase in the OH absorption of the wavelength of 1.38 μm.

In the graph of FIG. 5, the diamond-shaped marks represent the samples prepared from the glass containing an excessively large amount of oxygen (samples SM9 and SM10). On the other hand, the square marks represent the samples prepared from the glass manufactured under the oxygen-free conditions (samples SM11 to SM13). As apparent from the graph of FIG. 5, the samples are clearly different from each other in the relationship between the NBOHC density and the increase in transmission loss caused by the exposure to hydrogen. To be more specific, the samples prepared from the glass containing an excessively large amount of oxygen bring about a larger increase in transmission loss, compared with the samples prepared from the glass manufactured under the oxygen-free conditions, in the case where the NBOHC density is the same. It is considered reasonable to understand that the peroxy radical reacts with hydrogen so as to form the OH group, leading to the increase in transmission loss in the case where the preform contains an excessively large amount of oxygen.

Samples SM11 to SM13 will now be described.

It is known in the art that the amount of the residual structural defect in the optical fiber is dependent on the cooling conditions in the fiber drawing step. In general, the residual amount of the defect is decreased if the cooling rate is low. It is considered reasonable to understand that the samples SM11 to SM13 were prepared by changing the cooling conditions by the reasons given below.

Specifically, the fiber drawing speed for sample SM11 was set higher than that for sample SM12. However, since the samples SM11 and SM12 had the same meniscus length, the cooling rate of the sample SM11 was rendered higher than that of the sample SM12. Likewise, the samples SM12 and SM13 were equal to each other in the fiber drawing speed. However, since the meniscus length for the sample SM12 was shorter than that for the sample SM13, the cooling rate for the sample SM12 was higher than that for the sample SM13.

It has been found that there are relationships given below among the samples SM11 to SM13:

$$C3 > C4 > C5, N3 > N4 > N5, \alpha3 > \alpha4 > \alpha5$$

Where C3, C4 and C5 represent the cooling rates of the samples SM11 to SM13, respectively, N3, N4 and N5 represent the NBOHC content of the samples SM11 to SM13, respectively, and α3, α4 and α5 represent the amount of increase of 1.38 μm OH absorption of the samples SM11 to SM13, respectively.

With that, the present inventors have conducted extensive research in an attempt to clarify the critical conditions by quantitatively defining the relationship between the NBOHC defect concentration and the amount of increase in the OH absorption of 1.38 μm and to clarify the conditions of the fiber drawing apparatus restricting the critical conditions.

As a result, it has been found that condition (1) given below is necessary:

(1) In a single mode optical fiber formed of a silica-based glass having Ge and/or F added thereto, it is necessary for the glass part to include at least the central core and the cladding region, for the glass part to have an outer diameter of about 125 μm, and for the content of the non bridging oxygen hole centers in the MFD region to be lower than that in the cladding region positioned outside the MFD region.

It has also been found that it is desirable to satisfy condition (2) given below:

(2) It is necessary for the density of the non bridging oxygen hole centers contained in the central region (region having a radius of 25 μm) of the glass part to be not higher than $1 \times 10^{13}$ spins/g in terms of a value of the spin density measured by the electron spin resonance method.

According to the studies made by the present inventors, in the optical fiber satisfying the conditions given above, the amount of increase in the OH absorption of 1.38 μm caused by the exposure to hydrogen of one atmosphere at room temperature was not larger than 0.1 dB/km.

The present inventors have also conducted an extensive research on the elements migrating within the glass by the diffusion of substances during the fiber drawing and on the paramagnetic defect caused by the element migration.

It has been found that it is desirable for the glass preform before the fiber drawing not to contain OH groups. In order to realize the particular state, a porous body is treated generally with chlorine in the manufacturing process of the synthesizing glass soot. Therefore, a large amount of chlorine is contained in general in the synthetic silica glass that is low in the OH group content. Chlorine is considered to substitute oxygen in the glass so as to form a Si—Cl bond. It is known in the art that the Si—Cl bond is easily broken by the heat or stress during the fiber drawing so as to form a paramagnetic defect called E' center (Si-E' shown in FIG. 1C).

The present inventors have made studies in order to see whether there is a relationship among the Si-E' remaining after the fiber drawing, the spin density of the NBOHC and the chlorine concentration in the glass before the fiber drawing.

Cladding layers having three different levels of the chlorine concentration were formed on the core preform same as sample SM13 referred to previously, followed by performing the fiber drawing under the conditions same as those for the sample SM13 so as to prepare fibers. The OH absorption loss of 1.38 μm before exposure to hydrogen and the amount of increase in OH loss caused by the exposure to hydrogen were examined, with the results as shown in Table 3. The unit of the chlorine concentration in the cladding region is ppm in Table 3.

TABLE 3

| No. | Chlorine concentration in clad | Initial absorption of 1.38 μm | Increase in absorption of 1.38 μm | Spin density (spins/g) Si-E | Spin density (spins/g) NBOHC |
|---|---|---|---|---|---|
| SM14 | 200 | 0.345 | 0.16 | 1.2E+13 | 1.2E+13 |
| SM14E | | | | 4.9E+13 | 4.9E+13 |
| SM15 | 1000 | 0.323 | 0.03 | 5.8E+13 | 1.4 + 12 |
| SM15E | | | | 3.0E+13 | ND |
| SM16 | 3500 | 0.286 | 0.03 | 3.3E+14 | 1.1E+12 |
| SM16E | | | | 3.1E; 14 | ND |

Figure 6:
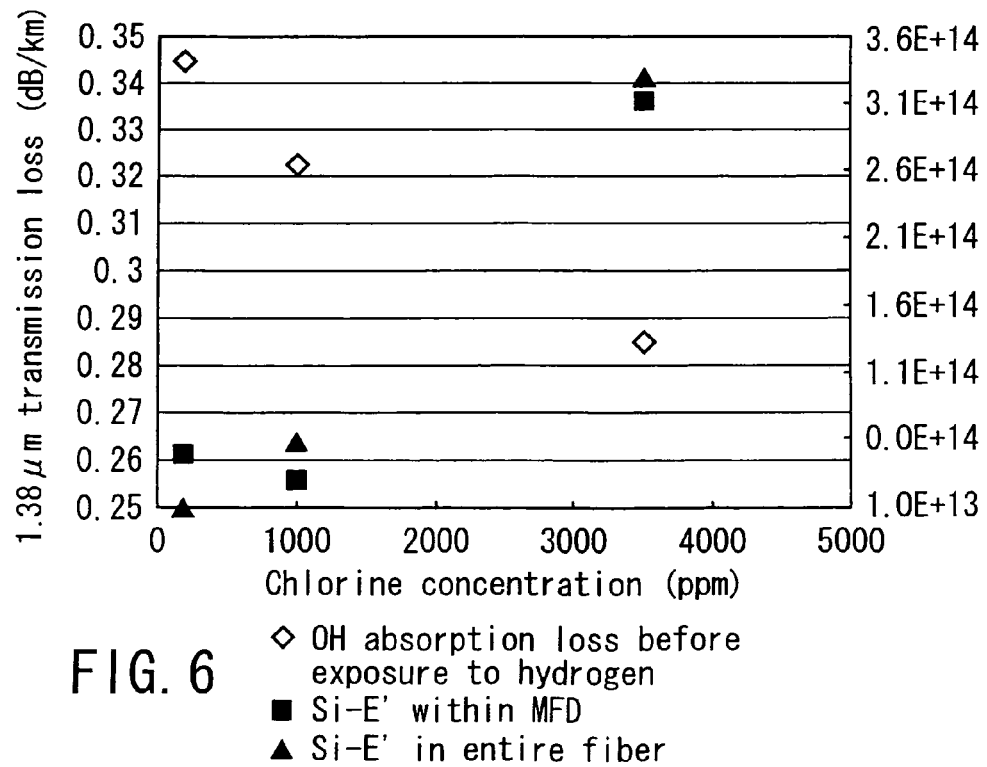
FIG. 6 is a graph showing the relationship between the chlorine concentration in the cladding region and the 1.38 μm OH absorption loss before exposure to hydrogen.
Figure 7:
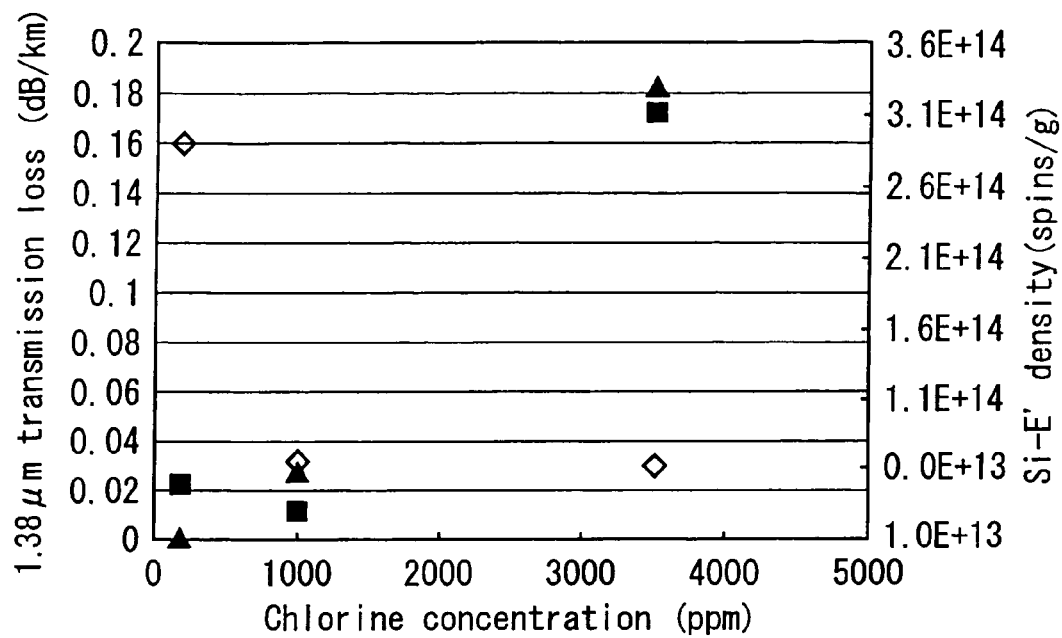
FIG. 7 is a graph showing the relationship between the chlorine concentration in the cladding region and the amount of OH loss increase caused by the exposure to hydrogen.

FIGS. 6 and 7 are graphs showing the experimental data given in Table 3.

FIG. 6 shows that, if the chlorine concentration in the cladding region is high, a large amount of Si-E' remains within the fiber, and that the OH absorption loss of 1.38 μm before exposure to hydrogen is small. On the other hand, FIG. 7 shows that a clear difference in the increase of the OH absorption amount caused by the exposure to hydrogen is not recognized between the case where the chlorine concentration was 3,500 ppm and the case where the chlorine concentration was 1,000 ppm. This clearly supports that, where the chlorine concentration falls within the range noted above, the amount of increase in the OH absorption is not affected by the chlorine concentration. It should be noted, however, that, if the chlorine concentration is lowered to 200 ppm, the amount of increase in the OH absorption caused by the exposure to hydrogen is considerably increased. This can be supported by the result of the measurement of the NBOHC.

To be more specific, it is considered reasonable to understand that, if the chlorine concentration in the cladding region is lowered, the viscosity of the glass is increased so as to lower the conformance of viscosity with the core portion, with the result that the defect tends to remain after the fiber drawing. It is also considered reasonable to understand that there is a mechanism that the chlorine molecules permit lowering the possibility of combination with the radicals buried therein.

Also, the Si-E' density inside the MFD was compared with that of the cladding region, with the result that the Si-E' density inside the MFD was found to be higher than that of the cladding region. This is opposite to the result in the case where the chlorine concentration was not lower than 1,000 ppm.

The experimental data pointed out above support that, in order to lower sufficiently the OH absorption loss of 1.38 μm before exposure to hydrogen to 0.35 dB/km or less and to lower sufficiently the amount of increase of the OH absorption caused by the exposure to hydrogen to 0.05 dB/km or less, it is desirable for the concentration of chlorine contained in the cladding region to be not lower than 1,000 ppm and for the density of the Si-E' remaining inside the fiber to be not lower than $5\times10^{13}$ spins/g.

A third embodiment of the present invention will now be described.

The amount of the structural defect remaining in the optical fiber is strongly dependent on the cooling process during the fiber drawing step. When the glass preform is drawn as a pseudo fluid into a fiber and rapidly cooled for solidification, the glass structure retains the state at the time when the fluidity was lost. It is considered reasonable to understand that the glass structure retains the liquid structure at the time of the solidification. The temperature at which the glass is solidified is called fictive temperature. It is known in the art that there is the relationship given below between the fictive temperature and the Rayleigh scattering coefficient A:

$$A=(8\pi^3/3)n^5 \cdot p^2 \cdot kTf \cdot KT$$

wherein n represents the refractive index; p represents the photoelasticity constant, k represents the Boltzmann constant, Tf represents the fictive temperature, and KT represents the isothermal compression rate (reciprocal of the volume elasticity).

According to "J. C. Mikkelsen, Jr. and F. L. Galeener, Journal of Non-Crystalline Solids 37(1980)71.84" and "A. E. Geissberger and F. L. Galeener, Physical review B, vol. 28, Number 6(1983), the fictive temperature Tf can be obtained from the ratio of defect line (D1 line) denoting the three-membered ring structure of the glass to the defect line (D2 line) denoting the four-membered ring structure of the glass in the Raman spectroscopic method for analyzing the glass structural defect by measuring the deviation between the Rayleigh scattering line and the Raman scattering line. The fictive temperature Tf can be actually obtained by measuring the Raman shift by using the light transmitted through the central region of the MFD or the scattered light that is scattered and brought back.

The Raman shift spectra of samples SM3 to SM5 were measured by the particular method so as to calculate the fictive temperature Tf. Table 4 shows the result.

TABLE 4

| No. | Tf (° C.) |
|---|---|
| SM11 | 1245 |
| SM12 | 1223 |
| SM13 | 1186 |

Figure 8:
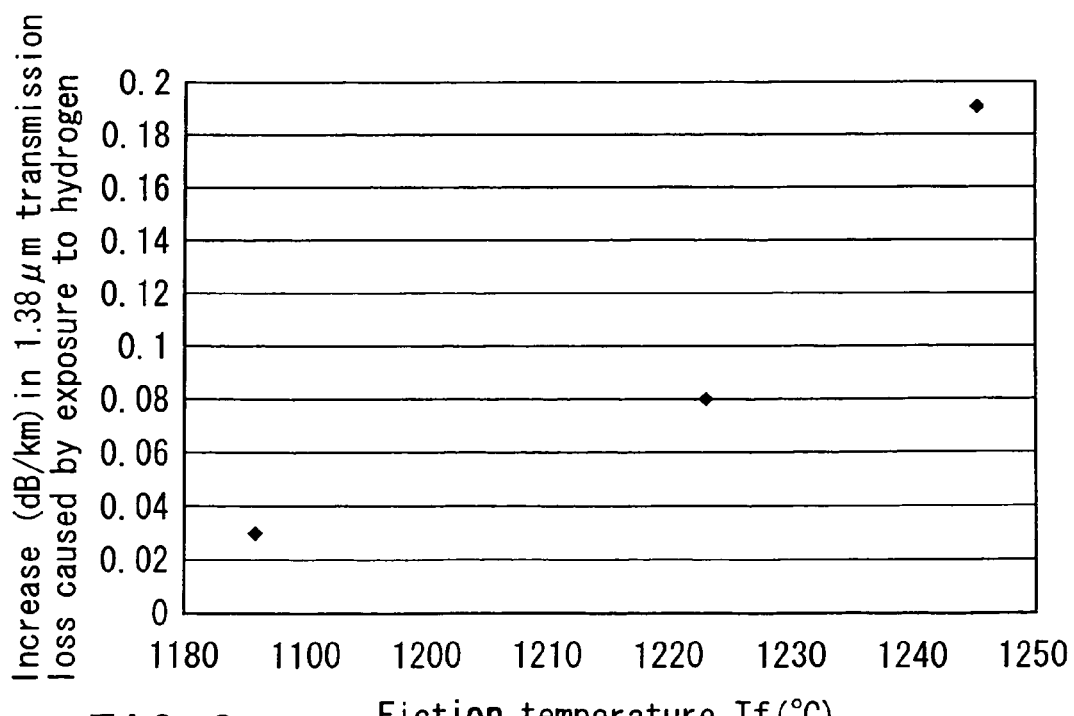
FIG. 8 is a graph showing the relationship between fictive temperature Tf and the amount of OH absorption increase at 1.38 μm.

FIG. 8 is a graph showing the relationship between the fictive temperature Tf and the amount of increase of the OH absorption of 1.38 μm.

As apparent from FIG. 8, it is possible to suppress the amount of increase of the OH absorption of 1.38 μm caused by the exposure to hydrogen to 0.05 dB/km, if the fictive temperature Tf in the central region of the MFD is not higher than 1,200° C.

The fiber drawing apparatus used for manufacturing the silica-based SMF described above will now be described.

As described previously, the present inventors have conducted an extensive research in an attempt to improve the hydrogen resistance and the long term reliability relating to the OH absorption loss of 1.38 μm in a silica-based SMF. Particular, the present inventors have placed a high emphasis on the fiber cooling process included in the fiber drawing step. It was certainly known in the art as a qualitative aspect that the cooling process greatly affects the structural defect remaining in the fiber. However, a quantitative analysis has not yet been conducted in this respect.

The present inventors have further conducted an extensive research in an attempt to extract the factors that make it possible to further improve the hydrogen resistance and in an attempt to optimize the parameters of such factors on the basis of the fiber drawing conditions that do not deteriorate the fiber characteristics themselves while modifying in various fashions the heating furnace portion of the fiber drawing apparatus.

As a result, it has been found that, in order to improve the resistance to hydrogen, it is important to cool continuously the silica-based glass preform starting with the portion that is made slender by the melting, i.e., the meniscus portion, until the surface temperature of the fiber is lowered to 1,200° C. at a cooling rate falling within a range of 1,000° C./sec to 3,000° C./sec. Further, it has been found that the sintering conditions of the silica-based glass soot are also important.

In the conventional method and apparatus, the quarts series glass preform is not continuously cooled starting with the meniscus portion.

The present inventors have also found that it is possible to realize a desired cooling process if the fiber drawing conditions include the condition that the slender portion of the drawn optical fiber preform, i.e., meniscus portion, has a length not smaller than "A×5", where A represents the diameter (mm) of the preform, under the practical fiber drawing speed of 300 to 1,500 m/min and the preform outer diameter of 35 to 120 mm in the manufacture of a silica-based SMF. The meniscus portion is defined herein as the length of the region where the diameter is decreased from 90% of the preform diameter to 5% by the melting of the optical fiber preform within the fiber drawing furnace.

Figure 9:
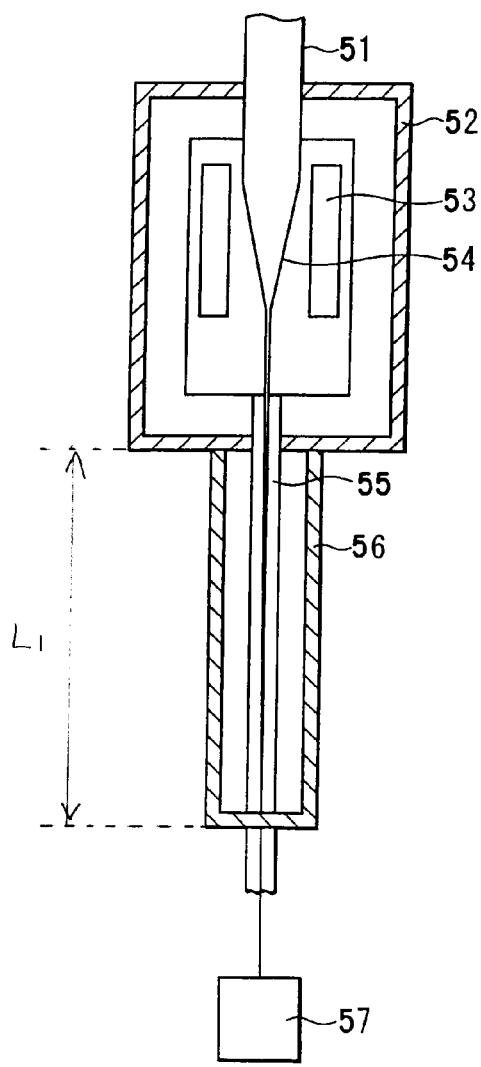
FIG. 9 schematically shows a fiber drawing apparatus according to another embodiment of the present invention.

FIG. 9 schematically shows the construction of a fiber drawing apparatus that permits achieving the fiber drawing conditions pointed out above. In the fiber drawing apparatus, a glass preform 51 is introduced into a heating furnace 52 for the fiber drawing operation. As shown in the drawing, a heater 53 for heating the preform 51 is arranged within the heating furnace 52. A reference numeral 54 shown in the drawing denotes a meniscus portion, and a reference numeral 57 denotes a take-up apparatus.

In the fiber drawing apparatus shown in FIG. 9, a lower cylinder 56 for continuously cooling the drawn optical fiber 55 is arranged in contact with the bottom end side of the fiber drawing furnace 52 as a means for realizing the fiber drawing conditions given above. It should be noted that a gas mixture of Ar and He is supplied at a flow rate of 5 liters/min into the lower cylinder 56 through the side wall thereof as shown in FIG. 10.

Figure 10:
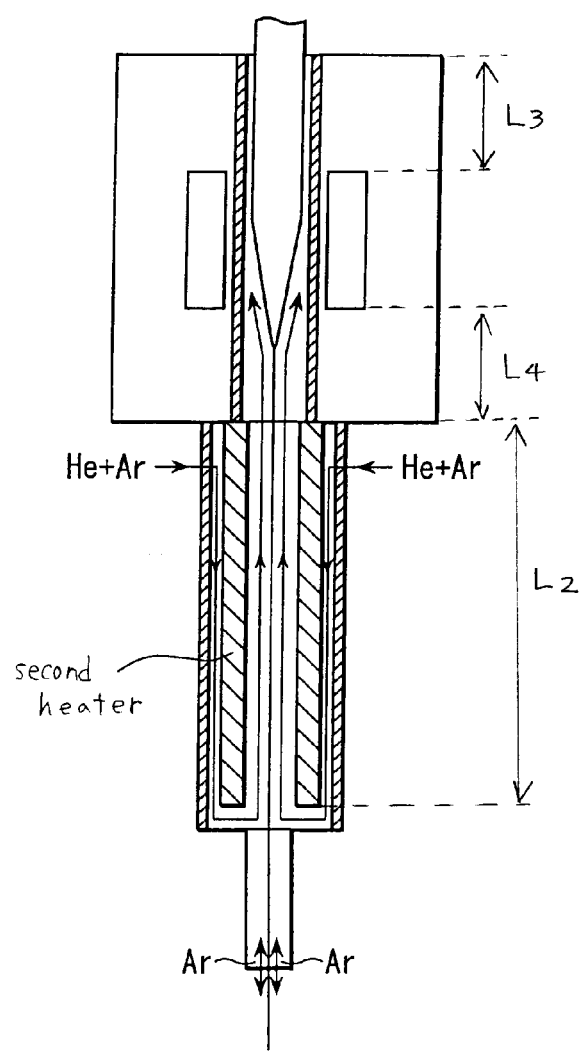
FIG. 10 schematically shows how a gas is allowed to flow in the lower portion of the fiber drawing apparatus shown in FIG. 9.

The apparatus shown in FIGS. 9 and 10 permits continuously cooling the region in the range of the meniscus portion 54 of the preform to the portion of the optical fiber 55 having a prescribed diameter to about 1,2000° C.

It has been found that it is possible to realize the particular slow cooling condition by setting the length $L_1$ (length of the slow cooling portion of the optical fiber 55) of the lower cylinder 56 to satisfy the relationship given below:

$$L_1 (mm) > B \times B/300$$

wherein B represents the drawing speed (m/min) of the optical fiber.

The slow cooling condition corresponds to the condition that the surface temperature of the drawn optical fiber 55 is continuously cooled from, for example, 1,700° C. to 1,200° C. at a cooling rate of 1,000 to 3,000° C./sec. It has also been found that a desired slow cooling condition can be achieved by arranging a heater for heating the withdrawn optical fiber 55 without forming a gas inlet port for introducing a gas into the clearance between the heating furnace 52 and the heater and by setting the length $L_2$ of the heater to satisfy the relationship given below:

$$L_2 (mm) > C \times B/200$$

wherein B represents the drawing speed (m/min) of the optical fiber, and C represents the diameter (mm) of the optical fiber preform.

Further, it has been found that it is possible to increase the heat insulating effect so as to facilitate a meniscus to take the desire form, if distance $L_3$ between the top end side of the heater 53 of the heating furnace 52 for heating the optical fiber preform 51 and the top end side of the heating furnace 52 and the length $L_4$ between the bottom end side of the heater 53 and the bottom end side of the heating furnace 52 satisfy the relationships given below:

$$L_3 (mm) > C \times B/200$$

$$L_4 (mm) > C \times B/200$$

wherein B represents the drawing speed (m/min) of the optical fiber, and C represents the diameter (mm) of the optical fiber preform.

As described above in detail, the present invention provides a single mode optical fiber having a resistance to hydrogen such that transmission loss is not increased even if the optical fiber is held under a hydrogen-containing atmosphere for a long time.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of manufacturing a single mode optical fiber formed of a silica-based glass and including a glass part having a central core and a cladding region, wherein at least one element selected from the group consisting of Ge and F is added to said glass part, and said glass part has an outer diameter of about 125 μm, comprising:
   heating an optical fiber preform in a heating furnace including a first heater so as to melt said optical fiber preform;
   fiber drawing an optical fiber from said molten optical fiber preform; and
   continuously cooling said drawn optical fiber starting with a meniscus portion in which diameter is decreased from 90% of the preform diameter to 5% of the preform diameter to a portion where the drawn optical fiber has a temperature of 1,200° C. at a cooling rate of 1,000 to 3,000° C/sec, wherein
   a lower cylinder is arranged in contact with a bottom end side of said heating furnace, and the optical fiber is continuously cooled by a gas which is supplied into the lower cylinder and is discharged through an upper end of the heating furnace, and
   a second heater is arranged in the lower cylinder so as to heat said optical fiber drawn from the heating furnace, wherein the gas is supplied through a side wall of the lower cylinder, flows downward between the side wall of the lower cylinder and the second heater, and then flows upward in the lower cylinder and the heating furnace, and is discharged through the upper end of the heating furnace.

2. The method of manufacturing a single mode optical fiber according to claim 1, wherein said optical fiber preform is a silica-based glass soot obtained by a flame hydrolysis method, and said soot is sintered under a condition substantially free from oxygen.

3. The method according to claim 1, wherein the lower cylinder has a length $L_1$ and a drawing speed of the optical fiber in the fiber drawing step meet an inequality given below:
   $L_1(mm) >$ drawing speed (m/min) of the optical fiber x drawing speed (m/min) of the optical fiber/300.

4. The method according to claim 3, wherein said second heater for heating the optical fiber withdrawn from within said heating furnace is arranged in said lower cylinder, and a length $L_2$ of said second heater, a diameter of the optical fiber preform, and a drawing speed of the optical fiber in the fiber drawing step meet an inequality given below:
   $L_2(mm) >$ diameter(mm) of the optical fiber preform x drawing speed (m/min) of the optical fiber/200.

5. The method according to claim 1, wherein distance L3 between a top end side of said first heater and a top end side of said heating furnace, distance $L_4$ between a bottom end side of said first heater and the bottom end side of said heating furnace, and a drawing speed of the optical fiber in the fiber drawing step meet inequalities given below:
   $L_3 >$ diameter (mm) of the optical fiber preform x drawing speed (m/min) of the optical fiber/200.
   $L_4 >$ diameter (mm) of the optical fiber preform x drawing speed (m/min) of the optical fiber/200.

6. The method according to claim 1, in which an Ar gas is supplied into a lower end of the lower cylinder.

7. The method according to claim 1, in which a mixture of an Ar gas and He gas is supplied into the side wall of the lower cylinder.

* * * * *